US008161026B2

(12) United States Patent
Amabile et al.

(10) Patent No.: US 8,161,026 B2
(45) Date of Patent: Apr. 17, 2012

(54) METHOD, COMPUTER PROGRAM PRODUCT AND APPARATUS FOR CAPTURING INEXACT DATE INFORMATION

(75) Inventors: Mimi Amabile, Boulder, CO (US); Jeannine Aloe Strope, Longmont, CO (US); Larry Constantine, Rowley, MA (US)

(73) Assignee: McKesson Information Solutions Holdings Limited, Hamilton (BM)

( * ) Notice: Subject to any disclaimer, the term of this patent is extended or adjusted under 35 U.S.C. 154(b) by 206 days.

(21) Appl. No.: 11/700,358

(22) Filed: Jan. 30, 2007

(65) Prior Publication Data
US 2008/0183780 A1 Jul. 31, 2008

(51) Int. Cl.
*G06F 17/30* (2006.01)
(52) U.S. Cl. ........................................ 707/706; 707/707
(58) Field of Classification Search .................. None
See application file for complete search history.

(56) References Cited

U.S. PATENT DOCUMENTS

| 5,963,940 | A | * | 10/1999 | Liddy et al. | 707/5 |
| 7,013,326 | B1 | * | 3/2006 | Suzuki et al. | 709/204 |
| 2002/0091698 | A1 | * | 7/2002 | Young et al. | 707/10 |
| 2004/0069311 | A1 | * | 4/2004 | Sasaki et al. | 128/897 |
| 2005/0033736 | A1 | * | 2/2005 | Carlin et al. | 707/3 |
| 2005/0191716 | A1 | * | 9/2005 | Surwit et al. | 435/13 |
| 2007/0160275 | A1 | * | 7/2007 | Sathyanarayana | 382/128 |

OTHER PUBLICATIONS

Travelocity, p. 1, Jan. 31, 2006.*
Wayback Engine, pp. 2, Dec. 29, 2009.*

* cited by examiner

*Primary Examiner* — Baoquoc To
(74) *Attorney, Agent, or Firm* — Alston & Bird LLP

(57) ABSTRACT

A method, computer program product and apparatus are provided for capturing inexact date information. In particular, a sophisticated date entry mechanism is provided that is capable of receiving, as input, date information associated with not only exact dates, but also "fuzzy" (i.e., partial or approximate) dates including, for example, "August of 2006," or "about the first of June in the year 1996." This date information may be input via any combination of a mouse, a keyboard, a microphone, or other input element, and in a plurality of different formats, including, for example, a plain language description of the exact or fuzzy date, and/or a relative description of the date. Once the date information has been received, the date entry mechanism is capable of determining in which format the date information was provided, and determining a date corresponding with the date information based on this format.

33 Claims, 5 Drawing Sheets

METHOD, COMPUTER PROGRAM PRODUCT AND APPARATUS FOR CAPTURING INEXACT DATE INFORMATION

FIELD OF THE INVENTION

In general, exemplary embodiments of the present invention relate to data capturing and formatting, and, in particular, to capturing inexact date information.

BACKGROUND OF THE INVENTION

In the healthcare arena, clinical information is gathered from patients who regularly give vague or inexact date references. For example, a patient may be asked to recall when he or she had his or her last tetanus, or similar, shot or vaccination. In response, the patient may state "when I was three years old" or "about ten years ago." Responses such as these may be difficult to capture in any useful manner.

In many instances the physician, nurse, or other healthcare employee, may be completing an electronic form or filling in a database with the information attained from the patient representing the patient's medical history. The information may be used to create a chronology of the medical-related events that have occurred, or will occur, throughout the patient's lifetime.

It is often, therefore, not only necessary that the healthcare employee be able to input the data references in a format that is accepted by the electronic form or database he or she is completing, but also that the date references be at least somewhat consistent so that they can be compared and sequenced relative to various other date references provided by the patient.

In many instances, the healthcare employee is forced to take what the patient stated (e.g., "when I was three years old") and make an on-the-spot calculation of the date the patient must have been referring to (e.g., by calculating from the patient's birth date), which can be quite imprecise and time consuming. In addition, there is often no way to input dates, whether calculated by the healthcare employee or specifically provided by the patient, that are incomplete or partial, for example where the patient states "sometime in August of 2005." It may further not be possible using existing applications for inputting date references and creating histories and chronologies, to differentiate between dates that are exact and known with certainty (e.g., where the patients states "My last flu shot was on May 10, 2003) and dates that are merely an approximation (e.g., where the patient states "around Jul. 15, 2006).

Similar issues may arise in many other areas not related to the healthcare arena where date references are needed, but are often not known with any certainty or exactness. For example, one other area may include the auto repair business where it may be necessary to know when the tires on an individual's car were last rotated or when the engine was last serviced. In response, the car owner may merely state "last summer," and this may be sufficiently exact for whatever purposes that date is needed.

A need, therefore, exists for an improved method of capturing inexact date information in an efficient manner that enables the date information to be consistently stored and subsequently used, for example, in relation to other date references similarly captured.

BRIEF SUMMARY OF THE INVENTION

Exemplary embodiments of the present invention provide an improvement over the known prior art by, among other things, providing a sophisticated mechanism for date entry that supports rapid, reliable input of exact, as well as "fuzzy" (i.e., partial or approximate) dates. According to exemplary embodiments, the date entry mechanism, which is also referred to throughout as a "smart calendar application," supports input, via any combination of a mouse, keyboard or other input element, of exact or "fuzzy" (i.e., partial or approximate) date information in a number of different formats. For example, the smart calendar application may receive date information or date references that are in plain language, such as when the user simply inputs via a keyboard "when the subject was ten years old." The smart calendar application may also receive date information that is relative to another date, such as when the user inputs "five months ago" or "three weeks from now." According to one exemplary embodiment, the relative date information may be input using plain language (i.e., using the keyboard to type in the plain language date information) or using various toggle option buttons provided by the smart calendar application graphical user interface (GUI) that are capable of being selected or toggled using, for example, a mouse. In one exemplary embodiment, the smart calendar application is capable of analyzing the date information provided and, where necessary, performing various calculations or interpretations of the date information in order to determine a date reference corresponding to the date information. For example, where the user inputs relative date information (e.g., "ten months ago"), the smart calendar application of one exemplary embodiment may calculate a partial or complete date corresponding to the relative date information (e.g., based on the current day). In addition, where the user inputs a plain language date description or information, the smart calendar application may interpret the words or phrases included in the plain language date description in order to determine to which date the date information was referring. The foregoing are but a few examples of the features of the smart calendar application, which can be used in virtually any area where date information is requested, and vague or inexact responses are known or provided.

According to one aspect of the invention, a method is provided for capturing inexact date information. In one exemplary embodiment, the method includes: (1) receiving inexact date information; (2) determining a format associated with the inexact date information; and (3) determining a date corresponding to the inexact date information based at least in part on the format.

In one exemplary embodiment, the format associated with the inexact date information includes one or more of a partial date, an approximate date, a plain language date description, or a relative date description, or combinations thereof. For example, the date information may include a plain language date description of a partial date, or a relative date description that is also approximate, and so on. Where, for example, the format associated with the inexact date information is a plain language date description, the step of determining a date corresponding to the inexact date information includes interpreting the plain language date description. In contrast, where, for example, the format associated with the inexact date information is a relative date description, the step of determining a date corresponding to the inexact date information includes calculating the date based at least in part on the relative date description.

In another exemplary embodiment, the date determined includes a partial or an approximate date. In yet another exemplary embodiment, the method further includes storing the date determined in a storage format that enables the date to be considered relative to at least one previous or subsequent date determined. In this exemplary embodiment, the previous or subsequent date determined includes either an exact, partial or approximate date. The method of this exemplary embodiment may further include creating a chronological history including the date and the previous or subsequent date determined.

According to another aspect of the invention, a computer program product is provided for capturing inexact date information. The computer program product may include at least one computer-readable storage medium having computer-readable program code portions stored therein. In one exemplary embodiment, the computer readable program code portions include: (1) a first executable portion for receiving inexact date information; (2) a second executable for determining a format associated with the inexact date information; and (3) a third executable portion for determining a date corresponding to the inexact date information based at least in part on the format.

According to yet another aspect of the invention, an apparatus is provided for capturing inexact date information. In one exemplary embodiment, the apparatus includes an input element for receiving inexact date information. The apparatus may further include a processor in communication with the input element and a memory in communication with the processor. The memory may store an application executable by the processor that, in one exemplary embodiment, is configured, upon execution, to determine a format associated with the inexact date information received and to determine a date corresponding to the inexact date information based at least in part on the format. In one exemplary embodiment, the input element includes at least one of a keyboard, a mouse or a microphone. According to another exemplary embodiment, the apparatus further includes a display, which is also in communication with the processor, that is configured to display the date determined so that this date can be confirmed.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
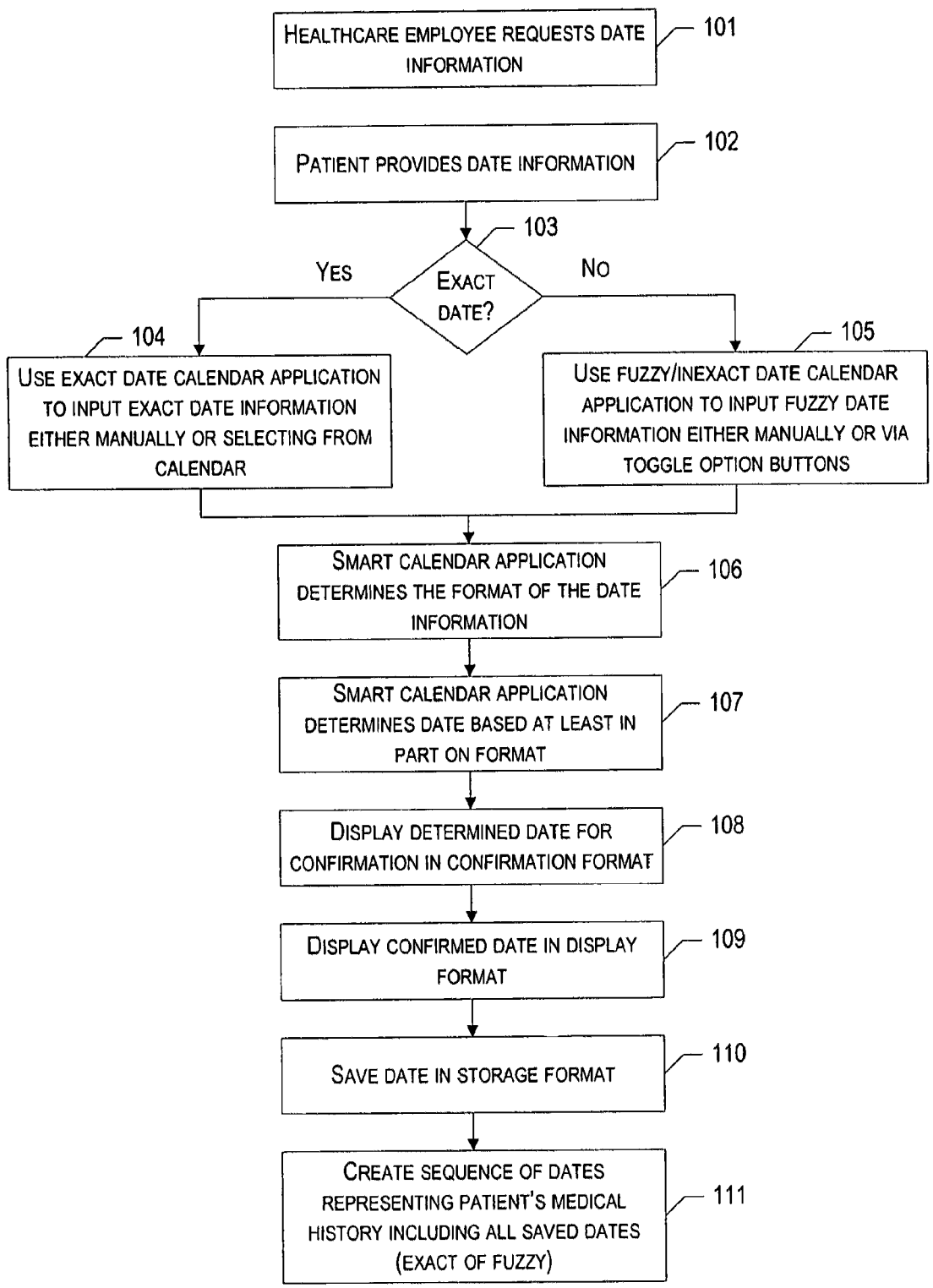
FIG. 1 is a flow chart illustrating the steps which may be take in order to implement the smart calendar application of one exemplary embodiment.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

GLOSSARY

As used herein, the term "exact date" refers to a complete date including a day, a month, and a year. The exact date may be provided in any installation-defined format including, for example, DD/MM/YYYY, Mmmmm d, YYYY (e.g., Jun. 7, 1969), MM.DD.YY, or the like. In contrast, the term "fuzzy" or "inexact" date refers to a date that is either "partial" or "approximate." A "partial date" refers to a date that is exact, but incomplete. For example, the date may include a month and a year, a year alone, a month and a day but no year (e.g., for the purposes of expressing recurring events), or a day alone. An "approximate date," on the other hand, refers to a date that is either complete or partial that has been flagged by a user as approximate or uncertain. Examples of approximate dates include "less than two years ago," "when I turned 50," or "around May of 1978." A fuzzy date may further be both partial and approximate, for example, "around August 1997." Finally, as used herein, the term "inexact date information" refers to date information that is input into the smart calendar application, the format of which includes any combination of a plain language date description, a relative date description, a partial date and/or an approximate date (e.g., a relative description of a partial date, or a plain language description of an approximate date). As discussed below, once the format of the inexact date information is determined, a date, fuzzy or exact, may then be determined.

Overview:

Exemplary embodiments of the present invention provide a smart calendar application that, among other things, provides a graphical user interface (GUI) that can be used to input inexact date information. In particular, the smart calendar application can be used to input, via a combination of a mouse, keyboard, microphone, or any other input element, an exact date or a fuzzy date (i.e., a partial or approximate date). The smart calendar application is highly tolerant of varied inputs, thus enabling these dates to be input in countless formats. For example, the user may type the date in plain language; he or she may describe the date in terms of its relation to another date; the user may select a toggle option button corresponding with the term "about," "before," or "after" and then select a date on a calendar, in order to indicate an approximate date; and/or he or she may type the exact date in a short or condensed form (e.g., "9/17/2005") or a long form (e.g., "Sep. 17, 2005"). The foregoing are but a few examples of the formats and methods in which exact and fuzzy dates may be input into the smart calendar application.

According to exemplary embodiments, the smart calendar application is capable of receiving the date information in its random format and converting this date information into a date or date reference that can be displayed for confirmation, stored, and subsequently compared to or considered in conjunction with various other dates that were similarly input in their various formats. In particular, the smart calendar application may be capable of calculating the date based on the date information provided and/or ascertaining the date by interpreting the words or phrases provided in the date information.

In addition, in one exemplary embodiment, the smart calendar application is capable of differentiating between exact and fuzzy dates, so that an individual who is subsequently looking at various dates associated with a particular subject (e.g., a patient) will know by looking at a particular date that it was merely an estimate or best guess at what the date was or will be, rather than an exact date that was provided with certainty.

Smart Calendar Application

Reference is now made to FIG. 1, which illustrates one scenario in which the date entry mechanism or smart calendar application of exemplary embodiments of the invention may be used. In this scenario, a physician, nurse or other healthcare employee is in the process of capturing a patient's medical history by completing an electronic form or database using his or her personal computer (PC), laptop, personal digital assistant (PDA), or similar electronic device, wherein the electronic device is configured to execute the smart calendar application. In addition, the electronic device configured to execute the smart calendar application may be employed by a patient or other person associated with the patient to input information regarding the patient. As noted above, and as will be recognized by those of ordinary skill in the art, exemplary embodiments of the invention are not, however, limited to this particular scenario. In contrast, exemplary embodiments may be used in any area where date information is requested, received and entered into some electronic form.

Assuming the above-described scenario, the healthcare employee begins by asking his or her patient a question that requires a response in the form of a date reference (Step 101). Examples of such questions may be, "When was your last tetanus shot?" or "How long has it been since you last had that sort of pain?" In response to the inquiry, in Step 102, the patient, or other individual placed in a similar situation, provides date information in one of many different formats. For example, the patient may state very precisely an exact month, day and year on which the referenced event occurred. Alternatively, the patient may provide a partial date including, for example, only a month and a year, or a season and a year. In yet another exemplary embodiment, the patient may provide the date information in terms of another date (e.g., today, or his or her birth date). Examples of such a relative date description may include "when I was ten years old," or "six months ago." The patient may also provide a complete and seemingly exact date, but qualify it by saying that he or she is unsure and that this is merely a best guess or an approximation. In general, there is almost no limit to the manners in which the patient, or other individual, may respond to a request for date information. As explained below, exemplary embodiments of the present invention provide a way of capturing this information, almost completely regardless of the format in which it is given, in an electronic form in a consistent and efficient manner.

Once the patient has provided his or her response, it is determined, in Step 103, whether the information provided is in the form of an exact date or a "fuzzy" date. As noted above, a "fuzzy" date may include either a partial date (e.g., August 2003) or an approximate date (e.g., about the first of the year of 1995). In some instances a fuzzy date may be both partial and approximate. For example, the patient may respond by saying "about ten years ago." The date is approximate primarily based on the patient's use of the term "about," and it is partial because the date generally includes either only a year (i.e., current year minus ten) or possibly a month (e.g., the current month) and a year, but no specific day. Still further, a fuzzy date may include the same level of detail as an exact date (i.e., month, day and year), but may be qualified as being an approximation, such as by being preceded by "about" or some other qualifier. In general, therefore, any date information that is provided that is not exact is considered fuzzy or inexact date information for the purposes of exemplary embodiments of the present invention.

Based on the determination made in Step 103, a different calendar application may be used to enter or input the date information into the electronic form or database being completed by the healthcare employee or similar individual. In particular, according to exemplary embodiments of the present invention, two separate calendar applications may be provided, namely, an exact date calendar application and a fuzzy date calendar application. If it is determined that the date information provided refers to an exact date, the process continues to Step 104, where the healthcare employee, or similar individual, uses the exact date calendar application to input the exact date into the electronic form. Alternatively, if it is determined that the date information provided is inexact or refers to a fuzzy date, the process continues to Step 105, where the healthcare employee uses the fuzzy date calendar application to input the fuzzy date information. Although described as being two separate applications, the exact date calendar application and the fuzzy date calendar application may be different portions of the same overall application in some embodiments.

In certain instances, an exact date may be required (e.g., where a physician needs to know the first day of a woman's last menstrual cycle for the purposes of calculating the estimated due date of a baby, or the exact date when a patient's insurance became active). In these instances, where the patient provides a fuzzy date, the physician may be prohibited from using the fuzzy date calendar application (e.g., it may not be available as a means for completing that particular data field in the electronic form being completed) and may instead be required to re-request the information in a more exact manner from the patient.

Figure 2:
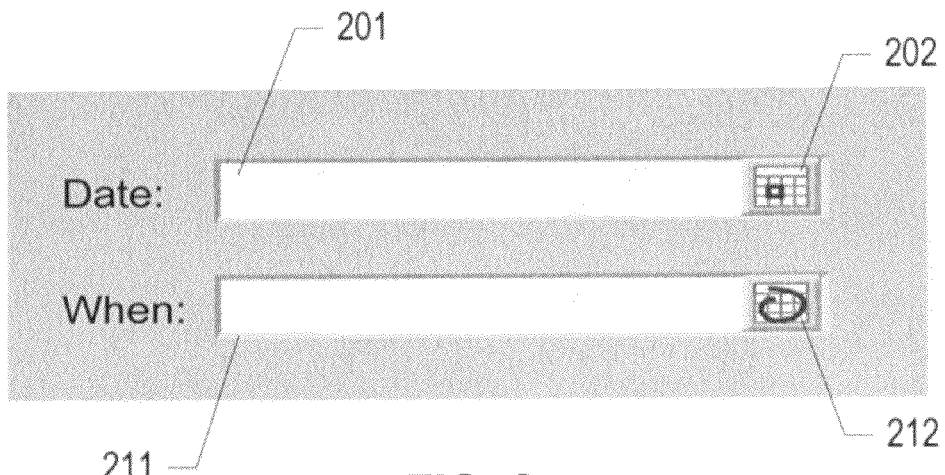
FIG. 2 is a graphical user interface (GUI) which may be used to access either the exact date calendar application or the fuzzy date calendar application in accordance with one exemplary embodiment.

FIG. 2 illustrates a graphical user interface (GUI) that may be used by the healthcare employee in order to access these separate calendar applications. The GUI of FIG. 2 may be embedded into any electronic form or application being completed in connection with one or more data fields of the form, database or application that are capable of receiving fuzzy and/or exact dates. By being embedded, it is meant that the software program or routine that generates the GUI of FIG. 2 and that receives the requested information may be called by or otherwise executed in conjunction with the entry of date information in the respective date fields. As shown, in order to access or use the exact date calendar application for the purpose of inputting, into the electronic form or database, the date information provided, the healthcare employee may either type the exact date in the exact date field 201 of the GUI (e.g., designated by the term "Date:") using any number of different entry formats (e.g., "Sep. 13, 1972," "9/13/72," "09.17.1972," "2006/12/01," etc.), or select the exact date calendar icon 202 on the GUI in order to gain access to a calendar from which the date may be selected (i.e., via mouse and/or keyboard).

According to one exemplary embodiment, the healthcare employee (hereinafter "the user") may input the exact date in the exact date field 201 as either an absolute or a relative date. Absolute dates may be entered in one of at least four different formats: numeric only, numeric with punctuation, abbreviated alphanumeric, or full alphanumeric. Examples of numeric only absolute dates include "0129" indicating Jan. 29, 2006 (assuming the current year is 2006), and "013158" indicating Jan. 31, 1958. Examples of absolute dates in the form of numeric dates with punctuation include "1.1" indicating January 1 of the current year, and "1.25/46" indicating Jan. 25, 1946. Abbreviated alphanumeric absolute dates may include, for example, "Jan1" meaning January 1 of the current year, or "Jan0546" meaning Jan. 5, 1946. Finally, full alphanumeric dates may include abbreviated alphanumeric dates where the month has been spelled out in full.

In one exemplary embodiment, relative dates are input as relative to the current date or today's date. In order to input a relative date, offset symbols (e.g., "+" or "−") may be used followed by an interval and a unit. Offsets or relative dates may be expressed in units of days, weeks, months or years. In one exemplary embodiment, a user may omit the unit, in which case an offset in days may be assumed. Similarly, a user may omit the interval, in which case the interval may be assumed to be one. The following provides a few examples of how a user may input the exact date as a relative date description in the exact date field 201.

TABLE 1

Relative Date Examples

| Input | Date Described |
|---|---|
| −1 | Yesterday |
| t | Today |
| t + 1 | Tomorrow |
| t1 | Tomorrow |
| 1 | Tomorrow |
| t − 1 d | Yesterday |
| −w | 1 week ago |
| d + 2 w | 2 weeks from today |
| +m | 1 month from today |
| n − y | 1 year ago |
| ny | 1 year from now |
| −3 m | 3 months ago |

Figure 3:
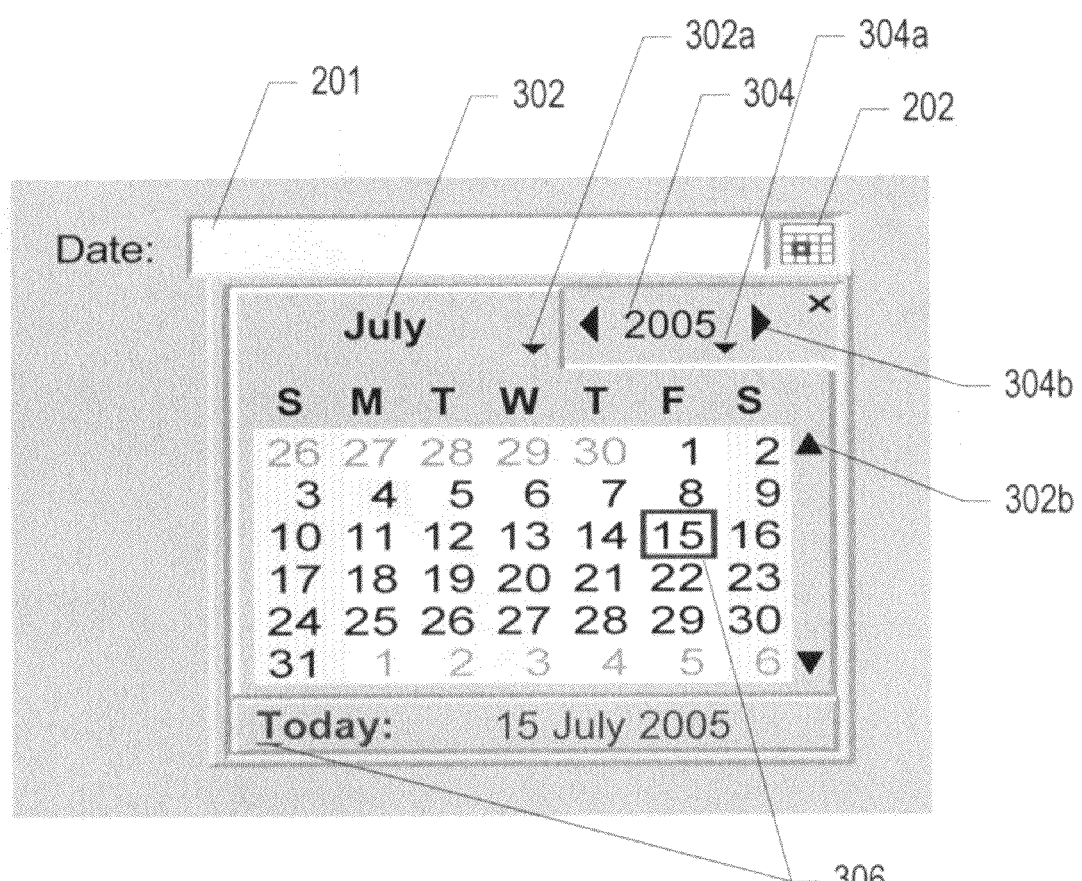
FIG. 3 illustrates an exemplary exact date calendar GUI from which an exact date may be selected in accordance with exemplary embodiments.

As will be discussed in more detail below, where the exact date calendar application is used to enter a relative date description, an exact date (i.e., including a month, day and year) will be yielded. In contrast, where the fuzzy date calendar application is used to enter a relative date description, the date yielded may not be exact (i.e., it may be partial or approximate).

Where the user prefers to select, rather than type, the exact date, FIG. 3 illustrates an exemplary exact date calendar GUI from which the date may be selected and which may be accessed by selecting or actuating the exact date calendar icon 202 of FIG. 2 according to exemplary embodiments of the present invention. As one of ordinary skill in the art will recognize, the exact date calendar GUI illustrated in FIG. 3 is provided for exemplary purposes only, and other calendar GUIs may similarly be used in conjunction with exemplary embodiments of the present invention in order to input a specific date without departing from the spirit and scope of the present invention.

As shown in FIG. 3, in one exemplary embodiment, the exact date calendar GUI may automatically display the current month 302 and year 304, with the current date, or today's date, 306 highlighted in some manner. In particular, in the exemplary embodiment shown in FIG. 3, today's date is highlighted within the display of the current month (i.e., with a square), as well as on its own at the bottom of the current month display. In addition, as is also shown in FIG. 3, shading, coloring, or other similar technique, may further be used in order to differentiate between weekdays and weekends, as well as to highlight various holidays.

Using arrows 302*a* and 304*a*, respectively, a user can view all of the months in a given year and some number of years (e.g., covering a decade), so that he or she can select the month and/or year to be displayed by the exact date calendar GUI. Alternatively, the user may scroll through the various months and years using arrows 302*b* and 304*b*, respectively, in order to locate and select the month and year of interest.

Once the user has selected the appropriate month and year on the exact date calendar GUI, he or she may select the date via either a mouse or a keyboard. As discussed in more detail below, in one exemplary embodiment, the date selected will then be displayed in a display format in the exact date field 201 of FIG. 2, as well as in a confirmation format in a confirmation tip provided to enable the healthcare employee, or other user, to confirm that the correct date has been selected. In addition, in one exemplary embodiment, once the date has been selected and displayed, the exact date calendar GUI will automatically close.

Returning to FIG. 2, in order for the user to access the fuzzy date calendar application where the patient has not provided an exact date, the user may either input the fuzzy date in the fuzzy date field 211 of the GUI (e.g., designated by the term "When:"), or select the fuzzy date calendar icon 212 on the GUI in order to gain access to a fuzzy date calendar GUI from which the date may be selected.

According to one exemplary embodiment, using the fuzzy date field 211, the user may input the month, day and/or year of a partial or approximate date via, for example, a keyboard or a microphone used in conjunction with voice recognition software and a voice recorder. For example, the user may type or state "May 2006" or "~Nov. 25, 1954." Alternatively, the user may use plain language to input the fuzzy date into the fuzzy date field 211. In other words, the user may input a plain language date description of the fuzzy or inexact date into the fuzzy date field 211. For example, the user may simply type or state exactly what the patient says in response to the inquiry for date information. Entries may include, for example, "several months ago," "when I was three years old," or "the beginning of last year." Alternatively, the user may use various symbols for typing in the fuzzy date. These symbols may include, for example, a tilda (~) to represent an approximate date, a less-than sign (<) to indicate that the date is before a given date, or a greater-than sign (>) to indicate that the date is after a given date. The foregoing plain language date descriptions and date entries having symbols may specifically identify a partial or an approximate date (e.g., "last May," which indicates the partial date May 2005, assuming the current year is 2006, or "around June 1 of 2005," which indicates the approximate date~Jun. 1, 2005), or it may describe the date in terms of or relative to another date (e.g., "three years ago" or "when I was three years old). As a result, date information input into the fuzzy date field 211 may be any combination of formats including, for example, a partial date, an approximate date, a plain language date description and a relative date description, just to name a few.

Figure 4A:
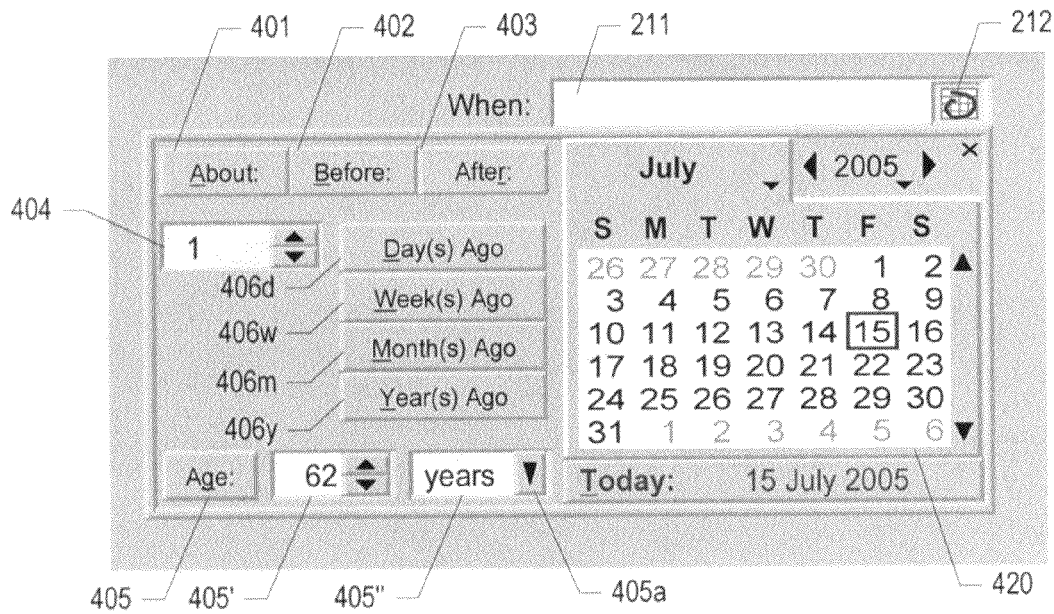
FIGS. 4A-4C illustrate exemplary fuzzy date calendar GUIs from which a fuzzy date may be selected or input in accordance with exemplary embodiments.
Figure 4B:
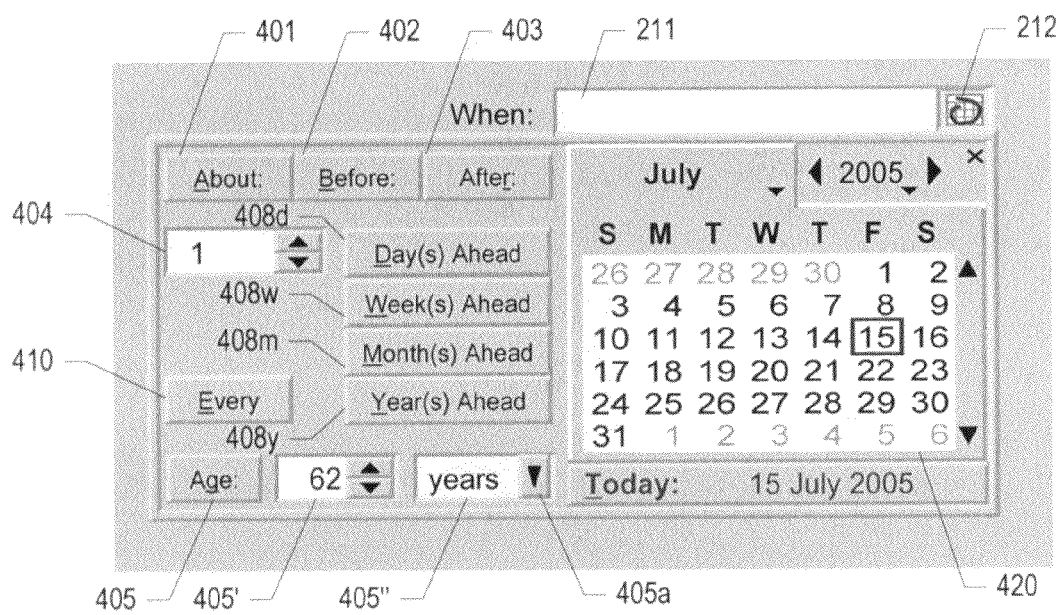

As noted above, the user may alternatively desire to select the fuzzy or inexact date using a fuzzy date calendar GUI. FIGS. 4A and 4B provide two examples of a fuzzy date calendar GUI from which the date may be selected and which may be accessed by selecting or actuating the fuzzy date calendar icon 212 shown in FIG. 2. In particular, FIG. 4A provides a fuzzy date calendar GUI, which may be used in order to input a fuzzy date occurring in the past, while FIG. 4B provides a fuzzy date calendar GUI, which may be used in order to input a fuzzy date occurring in the future (e.g., where the physician or auto repair technician wants the patient or car owner to return in six weeks). As one of ordinary skill with recognize, the fuzzy date calendar GUIs of FIGS. 4A and 4B are provided for exemplary purposes only, and other similar GUIs may be used to input fuzzy or inexact dates without departing from the spirit and scope of the present invention.

Referring to FIG. 4A, according to one exemplary embodiment, the fuzzy date calendar GUI may include one of a plurality of toggle option buttons through which the user can input the fuzzy or inexact date occurring in the past. In particular, as shown, three buttons, "About" 401, "Before" 402 and "After" 403 may be used to qualify any subsequent date information provided. In one exemplary embodiment, the qualifier buttons 401, 402 and 403 can be turned on or off, but are linked so that only one is selected at a time. In addition, these buttons 401, 402 and 403 may be used to qualify any date, complete or partial. For example, where the patient states "before Jun. 15, 1996," the healthcare employee may actuate (e.g., select or toggle using his or her mouse) the "Before" button 402 prior to or after selecting the date Jun. 15, 1996 using a calendar display 420 also provided by the fuzzy date calendar GUI.

In addition, the fuzzy date calendar GUI may further include several interval buttons which can be used to input a relative date description. In particular, a data field 404 may be provided in which the user can input the number of days, weeks, months or years ago that an event occurred. The user may then select one of several unit buttons including, for example, "Day(s) Ago" 406*d*, "Week(s) Ago" 406*w*, "Month(s) Ago" 406*m*, or "Year(s) Ago" 406*y*, in order to specify the unit of time referred to by the patient. As with the qualifier buttons 401, 402, and 403, in one exemplary embodiment, the unit buttons 406*d*, 406*w*, 406*m*, and 406*y* are toggled, such that only one can be selected or actuated at a time. As one of ordinary skill in the art will recognize the qualifier buttons (e.g., "About" 401, "Before" 402, and "After" 403) may be used in conjunction with the aforementioned data field 404 and unit buttons 406*d*, 406*w*, 406*m*, 406*y* in order to input an approximate date that is provided in relative terms. For example, if the party asked to provide date information responds "about ten years ago," the "About" button 401 would be used in conjunction with inputting "ten" into data field 404 and selecting the unit button, "Year(s) Ago" 406*y*.

As noted above, where a relative date is input using the exact date calendar GUI, the date realized will be an exact date. For example, where the user inputs "n-y" to indicate a date exactly one year ago, the date realized will include the day, month and year occurring exactly one year prior to the current date or today's date. In contrast, where the relative date description is input into the fuzzy date calendar GUI, using either the above mentioned radio buttons, or via the fuzzy date field 211 of FIG. 2 and using the symbols discussed above with respect to the exact date field 201 (e.g., "t+1" or "−3 m"), the date that is realized may be fuzzy or inexact. For example, according to one exemplary embodiment, intervals indicated in days may be considered to be exact dates, unless the user has set or selected the "About" button 401. In contrast, intervals in weeks may be considered to be approximate, but complete, dates. For example "three weeks ago" may become "~Jul. 14, 2006." And longer intervals may imply a partial date. For example, "five years ago" may mean "August 2001" not "Aug. 4, 2001;" and "three months ago" may mean "May 2006" rather than "~May 4, 2006."

Figure 4C:
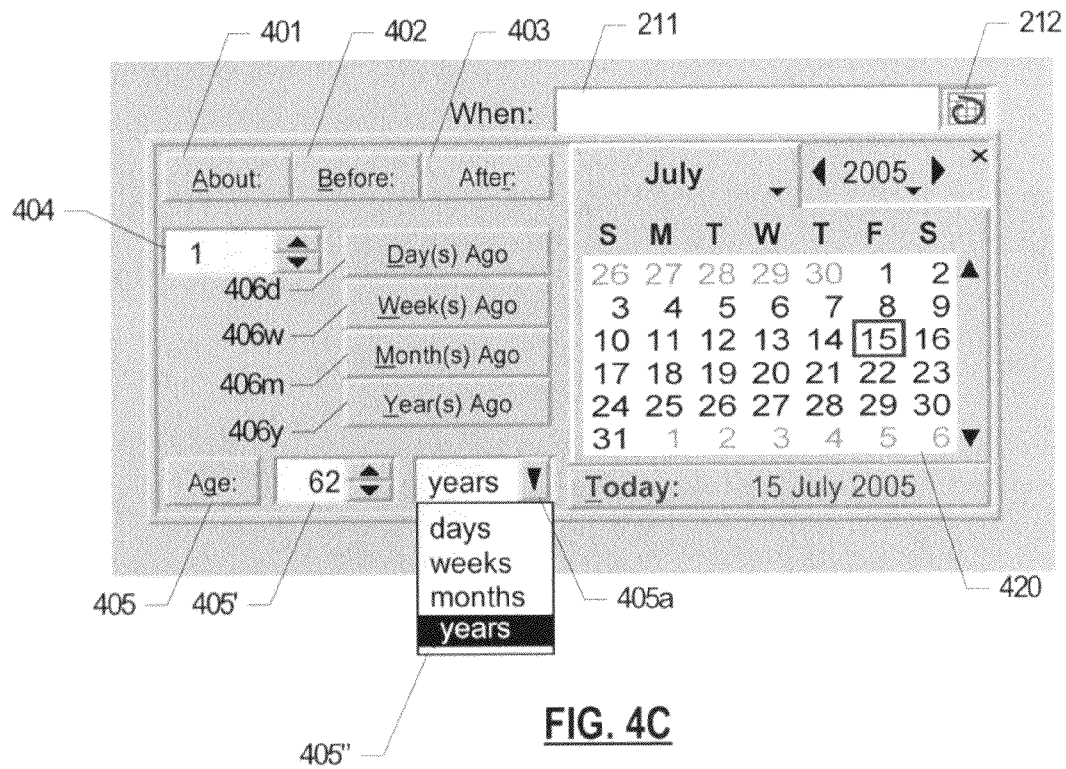

Finally, the fuzzy date calendar GUI of one exemplary embodiment may further include an "Age" button 405 and corresponding unit value 405' and type 405" data fields. The healthcare employee may use this button and corresponding data fields in order to capture date information provided in terms of the patient's age at the time a certain event occurred. For example, where the patient states "I broke my leg when I was 13," the healthcare employee may select or actuate the "Age" button 405, then scroll to the number 13 in the unit value data field 405' and select "years" in the unit type data field 405". As shown in FIG. 4C, using the arrow 405*a* corresponding with the unit type data field 405", a user may access a sequence of unit types, from which he or she may select, including, for example, days, weeks, months and years. According to one exemplary embodiment, the unit value 405' and unit type 405" data fields may be pre-filled with the patient's current age. Alternatively, these fields may remain blank until completed by the healthcare employee or similar individual.

Referring now to FIG. 4B, a similar fuzzy date calendar GUI may be provided for use when inputting fuzzy or inexact dates occurring in the future. As noted above, this may be used, for example, where a physician wants his or her patient to take a certain medication every few days for the next ten months, or where an auto shop wants a car owner to come back in 90 days to have his or her repairs re-looked at. The GUI of FIG. 4B differs from that of FIG. 4A primarily in the meaning attributed to the unit buttons 408*d*, 408*w*, 408*m*, 408*y*. In particular, instead of inputting relative date information in terms of days, weeks, months or years "ago," a user can similarly input a number of days, weeks, months or years "ahead" or in the future using the "Day(s) Ahead" 408*d*, "Week(s) Ahead" 408*w*, "Month(s) Ahead" 408*m*, and "Year(s) Ahead" 408*y* buttons.

In addition, unlike the GUI used for inputting fuzzy dates of the past, the fuzzy date calendar GUI of FIG. 4B includes an "Every" button 410, which can be used by the healthcare employee, or similar individual, to input a recurring date in the future. According to one exemplary embodiment, a recurring date is a special form of a partial date in the future that indicates regular or recurring events and consists of a month only, a month and day, or a day only. In one exemplary embodiment, recurring dates may be modified by qualifiers. For example, a recurring date may include "every March," "about every 15$^{th}$ of the month," or "about every June 30$^{th}$." A user may enter a recurring date by, for example, actuating the "Every" button 410 and then either selecting an exact date on the calendar display 420 or inputting a partial or approximate date in the fuzzy date field 211. The user may further qualify the recurring date using any one of the qualifier buttons "About" 401, "Before" 402, or "After" 403. In one exemplary embodiment, the user may further input a recurring date by using the symbol "@" followed by the partial or approximate date in the fuzzy date field 211.

Returning now to FIG. 1, once the date information has been input, in any combination of the manners discussed above with regards to Steps 104 and 105, and FIGS. 2, 3, and 4A-C, the process continues to Step 106 where the smart calendar application determines in which format the date information has been provided. As noted above, this format can include, for example, any combination of an exact, partial or approximate date, a plain language description of an exact or inexact date, and a relative date description of a partial, approximate or exact date. Once the format has been determined, the smart calendar application can, in Step 107, determine the date referred to by the user based at least in part on the determined format.

To illustrate, where, for example, the user has input (e.g., via a keyboard or a microphone) a plain language description of a particular date, whether partial or approximate, into the fuzzy date field 211, the smart calendar application may be required to interpret the terms or phrases provided in order to determine the date to which the plain language date description refers. For example, the following table provides a plurality of exemplary keywords or phrases which the smart calendar application may be configured to interpret.

TABLE 2

Free Text Input—Keywords and Phrases

| Keyword or Phrase | Usage Example | Interpretation |
|---|---|---|
| about | "about July" | "~July 2006" (i.e., July of this year) |
| around | | Same as about |
| before | "before March 1" | "<Mar. 1, 2006" |
| after | "after age 4" | ">1947" |
| today | "today" | today's date |
| yesterday | "yesterday" | today's date −1 |
| tomorrow | "tomorrow" | today's date +1 |
| next | "next week" | ~today's date +7 |
|  | "next April" | "April 2007" |
| last | "last month" | "July 2006" |
|  | "last June" | "June 2005" |
| this | "this April" | "April 2006" |
| a few | "a few years ago" | "~2003" (i.e., current year −3) |
| a couple of | "a couple of years ago" | "~2004" (i.e., current year −2) |
| ago | "2 months ago" | "June 2006" (i.e., current month −2) |
| back | "2 months back" | "June 2006" (i.e., current month −2) |
| ahead | "2 months ahead" | "October 2006" (i.e., current month +2) |
| from now | "2 months from now" | "October 2006" (i.e., current month +2) |
| every | "every July 15" | recurring date |

In one exemplary embodiment, where the smart calendar application is unable to interpret a particular word or phrase in the smart calendar application, it will simply display and store (discussed below) the exact description as input, without making any interpretations or changes.

In another exemplary embodiment, assuming the user has input a relative date description (e.g., via the exact or fuzzy date fields 201 or 211, using any of the interval unit buttons 406d, 406w, 406m, 406y, 408d, 408w, 408m, or 408y, or the "Age" button 405 and unit value and type data fields 405' and 405" of FIGS. 4A, 4B of 4C), in order to perform Step 107, the smart calendar application may be required to calculate the date based on the current date or the patient's birth date. For example, if the user has input "age 3," either as a plain language description or using the "Age" button 405 and data fields 405' and 405", and the exact date of birth of the individual (i.e., month, day and year) is known, the smart calendar application will calculate the date on which the patient was three by adding three years to the individual's birth date. If the user has toggled the "About" button 401 in conjunction with inputting "age 3" in some manner, the smart calendar application will yield an approximate date based on the individual's birth date (e.g., "~May 4, 1981" or "~May 1981"), rather than an exact date (e.g., "May 4, 1981"). A similar calculation may be performed where the user has input a relative date (e.g., "three months ago"), only using the current date as opposed to the patient's, or similar individual's, birth date.

Figure 5:
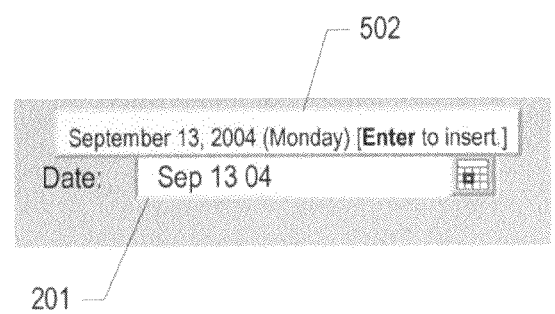
FIG. 5 illustrates a confirmation tip displayed in accordance with exemplary embodiments of the present invention.

Once the sophisticated date entry mechanism or smart calendar application has determined to what date the inputted date information is referring, the smart calendar application will, in Step 108, display the determined date in a "confirmation tip," similar to that shown in FIG. 5. For example, as shown, where it is determined that the date to which the entered date information refers is Sep. 13, 2004, the smart calendar application may display this date as a pop-up field 502 corresponding with and slightly offset from the date field currently being completed by the healthcare employee or similar individual (e.g., as shown, the exact date field 201). The pop-up field 502, or confirmation tip, may further include an "accept tag" that asks that the user, for example, press Enter in order to confirm the date displayed and insert that date into the date field being completed. In one exemplary embodiment, the confirmation tip is continuously updated as the individual inputs the date information. In another exemplary embodiment, where the smart calendar application is unsure of the date determined, a question mark (?) may be displayed following the date in the confirmation tip 502 in order to signify uncertainty. In addition, in one exemplary embodiment, where the smart calendar application detects an error in the date entered, or the date is unacceptable (e.g., February 30$^{th}$), the confirmation tip 502 may not display an accept tag and the background color of the confirmation tip may change to, for example, orange. In addition, where the user presses Enter anyway, or tabs over to another date or data field, according to one exemplary embodiment, an error message may be displayed in connection with the date field that includes an unacceptable date.

Once an acceptable date has been displayed in a confirmation tip 502 and the user has confirmed that date, the smart calendar application will, in Step 109, display the confirmed date in the date field and, in Step 110, save the confirmed and displayed date using a particular storage format. In particular, according to one exemplary embodiment of the present invention, the date information/date reference entered, determined, displayed and saved may take on one of several different formats, namely an "entry format," a "confirmation format," a "display format," and a "storage format." The entry format refers to the format in which the date was entered and, as discussed above, can take on any number of different formats. The confirmation format refers to the format within which the determined date is displayed in the confirmation tip. In the exemplary embodiment shown in FIG. 5, the confirmation format comprises a long format including the full month name followed by a two-digit date and a four-digit year. Using the long format as the confirmation format may help to ensure that the user fully considers the date prior to confirming it. The display format, in contrast, refers to the format of the date after it has been confirmed and as it appears in the data field displayed. As shown in FIG. 5, the display format may comprise a short format including an abbreviated month, a one or two-digit day, and a two-digit year.

Finally, the storage format is the format in which the date is actually saved in a database or similar storage system for later use when, for example, creating a chronological list of all of the events making up the patient's medical history (i.e., Step 111 of FIG. 1). The storage format of one exemplary embodiment allows for partial or incomplete dates and for flagging of approximate dates. In particular, according to exemplary embodiments of the present invention, exact and inexact or fuzzy dates are stored in a format that allows the comparison and sequencing of these dates and further allows an individual reviewing the sequence of dates to differentiate between exact dates that are known with certainty from approximate dates (i.e., best guesses or uncertain dates) and partial dates that may or may not be known with any certainty.

To illustrate, for example, according to one exemplary embodiment, where a sequence of events is created, a set of collation rules may be followed wherein, for presentation purposes: (1) "before" ("<") year-only partial dates (e.g., "<2000") may be presented first before approximate ("~") year-only partial dates (e.g., "~2000") followed by year-only partial dates (e.g., "2000") ahead of any other dates in a given year (e.g., "Mar. 3, 2000"); (2) "after" (">") year-only partial dates (e.g., ">2000") may presented after all other dates in a given year; (3) "before" ("<") month-and-year-partial dates (e.g., ">March 2001") may be presented first before approximate month and year partial dates (e.g., "~March 2001") followed by month and year partial dates (e.g., "March 2001") ahead of any other dates in a given month (e.g., "Mar. 15, 2001"); (4) "after" (">") month-and-year partial dates (e.g., ">March 2001") may be presented after all other dates in a given month; (5) "before" ("<") complete dates (e.g., ">Sep. 21, 2002") followed by approximate complete dates (e.g., "~Sep. 31, 2002") may be presented before any exact complete dates (e.g., "Oct. 13, 2002") for a given day; and (6) "after" (">") complete dates (e.g., ">Dec. 25, 2003") may be presented after any exact complete date.

In one exemplary embodiment, "before" year-only partial dates may be treated as if they came before January 1 but after December 31, and "after" year-only partial dates may be treated as if they happened after December 31 but before any "before" year-only partial date of the year earlier. Approximate year-only partial dates may further be treated as if they occurred on July 1, while approximate month-and-year partial dates may be treated as if happening on the 15th of the month, and so forth.

The foregoing merely illustrates how exemplary embodiments of the present invention provide a technique for capturing exact and fuzzy dates almost completely regardless of the format in which they are provided, and displaying and formatting those dates so that they can be differentiated from yet considered relative to one another.

Figure 6:
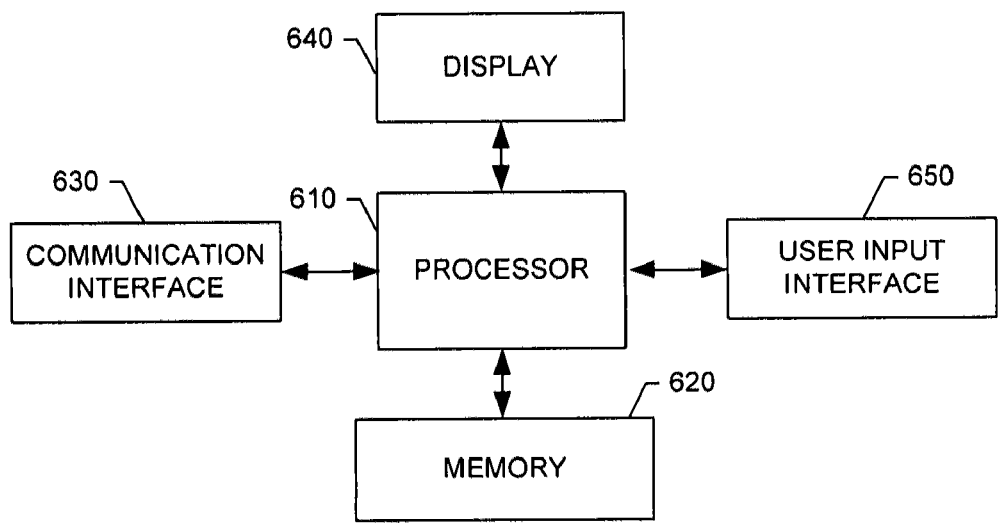
FIG. 6 is a block diagram of an exemplary electronic device configured to execute the smart calendar application of exemplary embodiments of the present invention.

Electronic Device Configured to Execute Smart Calendar Application:

Referring now to FIG. 6, a block diagram of an exemplary electronic device (e.g., PC, laptop, PDA, etc.) configured to execute the smart calendar application of exemplary embodiments of the present invention is shown. The electronic device may include various means for performing one or more functions in accordance with exemplary embodiments of the present invention, including those more particularly shown and described herein. It should be understood, however, that the electronic device may include alternative means for performing one or more like functions, without departing from the spirit and scope of the present invention. As shown, the electronic device may generally include means, such as a processor, controller, or the like 610 connected to a memory 620, for performing or controlling the various functions of the entity.

The memory can comprise volatile and/or non-volatile memory, and typically stores content, data or the like. For example, the memory typically stores content transmitted from, and/or received by, the electronic device. Also for example, the memory typically stores software applications, instructions or the like for the processor to perform steps associated with operation of the electronic device in accordance with embodiments of the present invention. In particular, the memory 620 may store computer program code for an application and other computer programs. For example, in one embodiment of the present invention, the memory may store computer program code for, among other things, receiving inexact date information, determining a format associated with the inexact date information, and determining a date corresponding to the inexact date information based at least in part on the format.

In addition to the memory 620, the processor 610 can also be connected to at least one interface or other means for displaying, transmitting and/or receiving data, content or the like. In this regard, the interface(s) can include at least one communication interface 630 or other means for transmitting and/or receiving data, content or the like, as well as at least one user interface that can include a display 640 and/or a user input interface 650. The user input interface, in turn, can comprise any of a number of devices allowing the electronic device to receive data from a user, such as a keypad, a touch display, a joystick or other input device.

CONCLUSION

Based on the foregoing, exemplary embodiments of the present invention provide a sophisticated date entry mechanism, or smart calendar application, that can be used in any area where date information is requested and vague or inexact date references are provided. These may include, for example, the auto repair industry, the hair dresser or salon industry, the carpet cleaning industry, and many other industries. The date entry mechanism of exemplary embodiments is advantageous because it supports exact, partial and approximate dates to enable sequencing of events (e.g., the chronological sequencing of events discussed above) and decision support (e.g., applying rules to saved values or driving alerts, such as if a physician's or dentist's office would like to notify a patient when the desired time for him or her to be seen is approaching, or when a patent is approaching an age at which a particular test is recommended). The date entry mechanism of exemplary embodiments is highly tolerant of varied inputs and enables simple, efficient input of dates of all kinds using various input elements. The date entry mechanism of exemplary embodiments further provides for efficient, flexible navigation over large spans of time and provides a common format and user interface for all date input.

As described above and as will be appreciated by one skilled in the art, embodiments of the present invention may be configured as a method and apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium (e.g., the memory 620 of FIG. 6) having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of capturing inexact date information, said method comprising:
   receiving inexact date information corresponding to an answer to a query provided to a patient, said inexact date information comprising one or more words or phrases that refer to a single date of relevance in relation to the patient's health, said single date of relevance comprising an exact date including a day, a month and a year;
   determining a format associated with the received inexact date information;
   determining, via a processor, an estimate of the exact date of relevance based at least in part on the format of the inexact date information, wherein the estimate of the exact date of relevance comprises a partial or an approximate date; and,
   storing the estimate of the exact date of relevance for use in relation to the patient.

2. The method of claim 1, wherein the format comprises a combination of one or more of a partial date, an approximate date, a plain language date description, or a relative date description.

3. The method of claim 2, wherein in an instance in which the format comprises a plain language date description, determining an estimate of the exact date of relevance comprises interpreting the plain language date description.

4. The method of claim 2, wherein in an instance in which the format comprises a relative date description, determining an estimate of the exact date of relevance comprises calculating the date based at least in part on the relative date description.

5. The method of claim 1 further comprising:
   displaying the estimated date such that the date may be confirmed.

6. The method of claim 1 further comprising:
   storing the estimated date in a storage format that enables the estimated date to be considered relative to at least one previous or subsequent estimated date, wherein the at least one previous or subsequent estimated date determined comprises a partial or approximate date.

7. The method of claim 6 further comprising:
   creating a chronological history comprising the estimated date and the at least one previous or subsequent estimated date.

8. The method of claim 1, wherein receiving inexact date information comprises receiving the date information via at least one of a keyboard, a mouse or a microphone.

9. The method of claim 1, wherein receiving inexact date information comprises receipt of one or more words spoken by the patient relating to the inexact date information and wherein determining the estimated date further comprises evaluating the inexact date information in relation to at least one of a current date and a date of birth of the patient, wherein the method further comprises:
   storing the inexact date information and the estimated date in a memory; and
   generating one or more tasks on the basis of the estimated date.

10. The method of claim 1, wherein the estimated date is determined with respect to at least one of a current date or a date of birth of the patient.

11. The method of claim 1, wherein the estimated date is determined relative to another date based on the received inexact date information.

12. A computer program product for capturing inexact date information, wherein the computer program product comprises at least one computer-readable storage medium having computer-readable program code portions stored therein, the computer-readable program code portions comprising:
   a first executable portion for receiving inexact date information corresponding to an answer to a query provided to a patient, said date information comprising one or more words or phrases that refer to a single date of relevance in relation to the patient's health, said single date of relevance comprising an exact date including a day, a month and a year;
   a second executable portion for determining a format associated with the received inexact date information;
   a third executable portion for determining an estimate of the exact date of relevance based at least in part on the format of the inexact date information, wherein the estimate of the exact date comprises a partial or an approximate date; and
   a fourth executable portion for storing the estimate of the exact date of relevance for use in relation to the patient.

13. The computer program product of claim 12, wherein the format comprises a combination of one or more of a partial date, an approximate date, a plain language date description, or a relative date description.

14. The computer program product of claim 13, wherein in an instance in which the format comprises a plain language date description, the third executable portion is configured to interpret the plain language date description.

15. The computer program product of claim 13, wherein in an instance in which the format comprises a relative date description, the third executable portion is configured to calculate the date based at least in part on the relative date description.

16. The computer program product of claim 12, wherein the computer-readable program code portions further comprise:
   a fifth executable portion for displaying the estimated date such that the date may be confirmed.

17. The computer program product of claim 12, wherein the fourth executable portion stores the estimated date in a storage format that enables the estimated date to be considered relative to at least one previous or subsequent estimated date, wherein the at least one previous or subsequent estimated date comprises a partial or approximate date.

18. The computer program product of claim 17, wherein the computer-readable program code portions further comprise:
a fifth executable portion for creating a chronological history comprising the estimated date and the at least one previous or subsequent estimated date.

19. The computer program product of claim 12, wherein the first executable portion is configured to facilitate receipt of the inexact date information via at least one of a keyboard, a mouse or a microphone.

20. The computer program product of claim 12, wherein receiving inexact date information comprises receipt of one or more words spoken by the patient relating to the inexact date information and wherein determining the estimated date further comprises evaluating the inexact date information in relation to at least one of a current date and a date of birth of the patient, wherein the computer program product further comprises:
a fifth executable portion for causing storage of the inexact date information and the estimated date in a memory; and
a sixth executable portion for generating one or more tasks on the basis of the estimated date.

21. The computer program product of claim 12, wherein the estimated date is determined with respect to at least one of a current date or a date of birth of the patient.

22. The computer program product of claim 12, wherein the estimated date is determined relative to another date based on the received inexact date information.

23. An apparatus for capturing inexact date information, said apparatus comprising:
a processor; and
a memory in communication with the processor, said memory storing an application executable by the processor, said application configured, upon execution, to:
receive inexact date information corresponding to an answer to a query provided to a patient, said date information comprising one or more words or phrases that refer to a single date of relevance in relation to the patient's health, said single date of relevance comprising an exact date including a day, a month and a year;
determine a format associated with the received inexact date information;
determine an estimate of the exact date of relevance based at least in part on the format of the inexact date information, wherein the estimate of the exact date of relevance comprises a partial or an approximate date; and
store the estimate of the exact date of relevance for use in relation to the patient.

24. The apparatus of claim 23, wherein the format comprises a combination of one or more of a partial date, an approximate date, a plain language date description, or a relative date description.

25. The apparatus of claim 24, wherein in an instance in which the format comprises a plain language date description, in order to determine an estimate of the exact date of relevance, the application is further configured, upon execution, to interpret the plain language date description.

26. The apparatus of claim 24, wherein in an instance in which the format comprises a relative date description, in order to determine an estimate of the exact date of relevance, the application is further configured, upon execution, to calculate the date based at least in part on the relative date description.

27. The apparatus of claim 23 further comprising:
a display in communication with the processor and configured to display the estimated date such that the estimated date may be confirmed.

28. The apparatus of claim 23, wherein the memory further stores the estimated date in a storage format that enables the estimated date to be considered relative to at least one previous or subsequent estimated date, wherein the at least one previous or subsequent estimated date comprises a partial or approximate date.

29. The apparatus of claim 28, wherein the application is further configured, upon execution, to create a chronological history comprising the estimated date and the at least one previous or subsequent estimated date.

30. The apparatus of claim 23, further comprising an input element in communication with the processor, wherein the input element receives the inexact date information and the input element comprises at least one of a keyboard, a mouse or a microphone.

31. The apparatus of claim 23, wherein receiving inexact date information comprises receipt of one or more words spoken by the patient relating to the inexact date information and wherein determine the estimated date further comprises an evaluation by the processor of the inexact date information in relation to at least one of a current date and a date of birth of the patient, wherein the processor is further configured to:
store the inexact date information and the estimated date in the memory; and
generate one or more tasks on the basis of the estimated date.

32. The apparatus of claim 23, wherein the estimated date is determined by the processor with respect to at least one of a current date or a date of birth of the patient.

33. The apparatus of claim 23, wherein the estimated date is determined by the processor relative to another date based on the received inexact date information.

* * * * *

UNITED STATES PATENT AND TRADEMARK OFFICE
CERTIFICATE OF CORRECTION

| | |
|---|---|
| PATENT NO. | : 8,161,026 B2 |
| APPLICATION NO. | : 11/700358 |
| DATED | : April 17, 2012 |
| INVENTOR(S) | : Amabile et al. |

It is certified that error appears in the above-identified patent and that said Letters Patent is hereby corrected as shown below:

Column 3
Line 14, "inexact date information; (2) a second executable for" should read --inexact date information; (2) a second executable portion for--

Column 11
Line 41, "405" of FIGS. 4A, 4B of 4C)" should read --405" of FIGS. 4A, 4B or 4C)--

Signed and Sealed this
Fourth Day of September, 2012

David J. Kappos
*Director of the United States Patent and Trademark Office*